United States Patent
Lu

(10) Patent No.: US 8,659,842 B1
(45) Date of Patent: Feb. 25, 2014

(54) IMAGE CAPTURING DEVICE AND ASSEMBLING METHOD THEREOF

(75) Inventor: Yin-Dong Lu, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 13/614,413

(22) Filed: Sep. 13, 2012

(51) Int. Cl.
*G02B 7/02* (2006.01)

(52) U.S. Cl.
USPC ............... 359/819; 359/811; 348/65; 385/117

(58) Field of Classification Search
USPC ......... 359/811, 819, 820, 822, 823, 513, 642; 348/65, 68, 335, 374, E5.024, E5.026; 219/121.41; 385/93, 117, 118; 372/36
See application file for complete search history.

(56) References Cited

U.S. PATENT DOCUMENTS

| | | | | |
|---|---|---|---|---|
| 3,865,178 A | * | 2/1975 | Legendre | 164/334 |
| 6,108,359 A | * | 8/2000 | Tatsuta | 372/36 |
| 6,472,247 B1 | * | 10/2002 | Andoh et al. | 438/64 |
| 7,409,130 B2 | * | 8/2008 | Hatori | 385/117 |
| 7,852,371 B2 | * | 12/2010 | Konstorum et al. | 348/65 |

\* cited by examiner

*Primary Examiner* — Loha Ben
(74) *Attorney, Agent, or Firm* — J.C. Patents

(57) ABSTRACT

An image capturing device and an assembling method thereof are provided. The assembling method includes the following steps. Firstly, a lens holder, a lens module and a casing are provided, wherein the lens holder includes a containing cavity. Next, the lens module is disposed in the containing cavity of the lens holder. Then, the casing is disposed on the lens holder and the lens module, wherein the casing covers a part of the lens module. Finally, an Ultrasonic Welding is applied on the lens holder and the casing for forming a melting interface between the lens holder and the casing so as to fix the casing to the lens holder.

10 Claims, 3 Drawing Sheets

IMAGE CAPTURING DEVICE AND ASSEMBLING METHOD THEREOF

BACKGROUND OF THE INVENTION

1. Field of the Invention

The present invention generally relates to an image capturing device and an assembling method. More particularly, the present invention relates to an image capturing device and the assembling method thereof.

2. Description of Related Art

With great advance in electronic technology, small and portable handheld electronic devices proliferate in the market. Handheld electronic devices including mobile phones, tablet PCs, laptops, etc., are used everywhere. Handheld electronic devices are no longer limited to the provision of communication alone but a multitude of wireless communication services. These accessory functions may include a miniature digital camera with an image capturing device that comprises a photo/image sensitive element and a lens.

An image capturing device generally includes a lens module, a casing and a lens holder. These components of the image capturing device are conventionally assembled together by two times of gel dispensing and two times of baking processes. In detail, a first gel dispensing process is firstly performed on the inner surface of the casing, and the lens module is then disposed in the casing. Next, a first baking process is performed for fixing the lens module to the casing. Next, a second gel dispensing process is performed on the lens holder and the lens holder is then disposed on the casing and covering the lens module. Finally, a second baking process is performed for fixing the lens holder to the casing.

However, the conventional assembling method of the image capturing device requires two times of gel dispensing and two times of baking processes which is rather complicated and the labor cost is high, thereby increases the production cost. Moreover, the assembling process of the image capturing device takes a longer time and is difficult for mass production.

SUMMARY OF THE INVENTION

Accordingly, the present invention is directed to an assembling method of an image capturing device which lowers the production cost and can be used in mass production.

The present invention is directed to an image capturing device which requires lower production cost and is suitable and faster for mass production.

The present invention provides an assembling method of an image capturing device. The assembling method includes the following steps. Firstly, a lens holder, a lens module and a casing are provided, wherein the lens holder includes a containing cavity. Next, the lens module is disposed in the containing cavity of the lens holder. Then, the casing is disposed on the lens holder and the lens module, wherein the casing covers a part of the lens module. Finally, an Ultrasonic Welding is applied on the lens holder and the casing for forming a melting interface between the lens holder and the casing so as to fix the casing to the lens holder.

The present invention provides an image capturing device including a lens holder, a lens module and a casing. The lens holder includes a containing cavity. The lens module is disposed in the containing cavity of the lens holder. The casing is disposed on the lens holder and the lens module. The casing covers a part of the lens module, wherein a melting interface is located between the lens holder and the casing to fix the lens holder and the casing together.

According to an embodiment of the present invention, the assembling method of the image capturing device further includes the following step. After the Ultrasonic Welding is applied on the lens holder and the casing, a cooling treatment is applied to solidify the melting interface.

According to an embodiment of the present invention, the melting interface is formed by melting part of the lens holder or the casing.

According to an embodiment of the present invention, the casing further comprises a light entering opening exposing the part of the lens module.

According to an embodiment of the present invention, the lens module includes wafer-level module (WLM).

According to an embodiment of the present invention, the melting interface is integrally formed with the lens holder.

According to an embodiment of the present invention, the melting interface is integrally formed with the casing.

Based on the above-mentioned description, the present invention applies the Ultrasonic Welding to form a melting interface between the lens holder and the casing, so as to fix the casing to the lens holder. Compared with the conventional assembling method, the present invention saves the complicated processes of two times of gel dispensing and baking, thereby simplifies the assembling process and shorten the assembling time of the image capturing device. Moreover, the present invention can lower labor cost is and is suitable for faster mass production.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
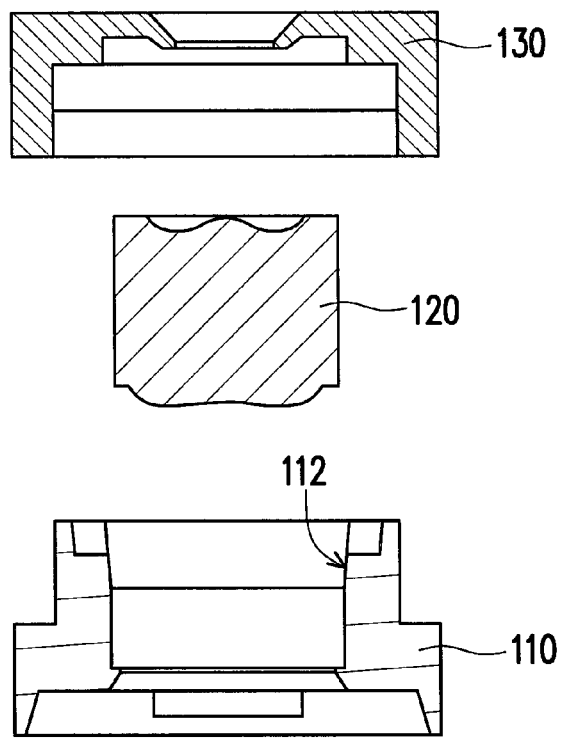
FIG. 1 to FIG. 4 are cross-sectional views of an assembling process of an image capturing device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
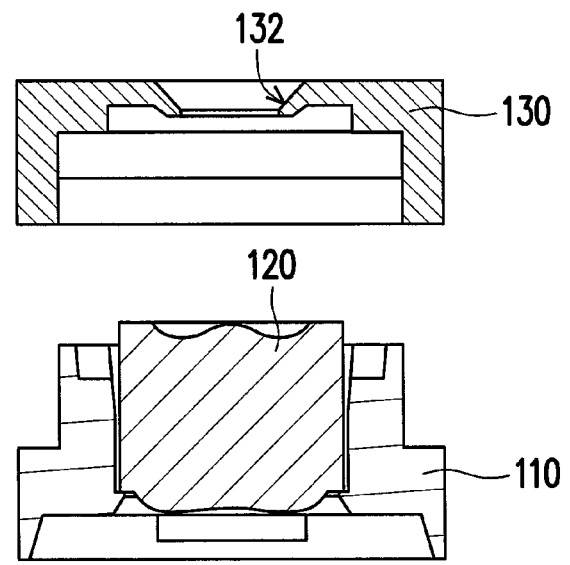
Figure 3:
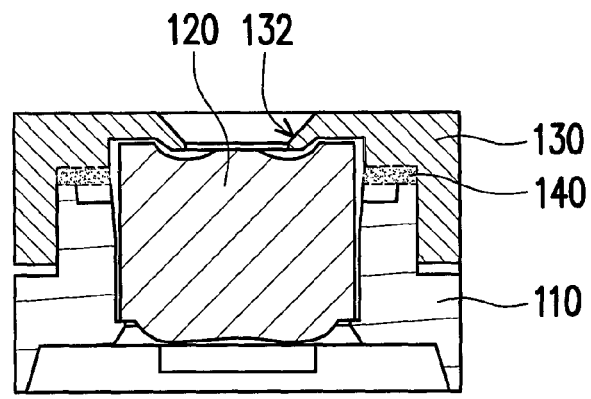

FIG. 1 to FIG. 4 are cross-sectional views of an assembling process of an image capturing device according to an embodiment of the invention. Referring to FIG. 1 first, in the present embodiment, the assembling method of the image capturing device includes the following steps. Firstly, a lens holder 110, a lens module 120 and a casing 130 are provided. The lens holder 110 includes a containing cavity 112. Then, as shown in FIG. 2, the lens module 120 is disposed in the containing cavity 112 of the lens holder 110 for capturing light and converting into images by an image sensor (not shown) thereof. In the present embodiment, the lens module 120 is engaged with the containing cavity 112 and the lens module 120 is, for example, a wafer level module (WLM). Next, referring to FIG. 3, the casing 130 is disposed on the lens holder 110 and the lens module 120. The casing 130 covers a part of the lens module 120. In the present embodiment, the casing 130 includes a light entering opening 132 exposing the part of the lens module 120 for light to pass through the light entering opening 132 and enter the lens module 120.

Figure 4:
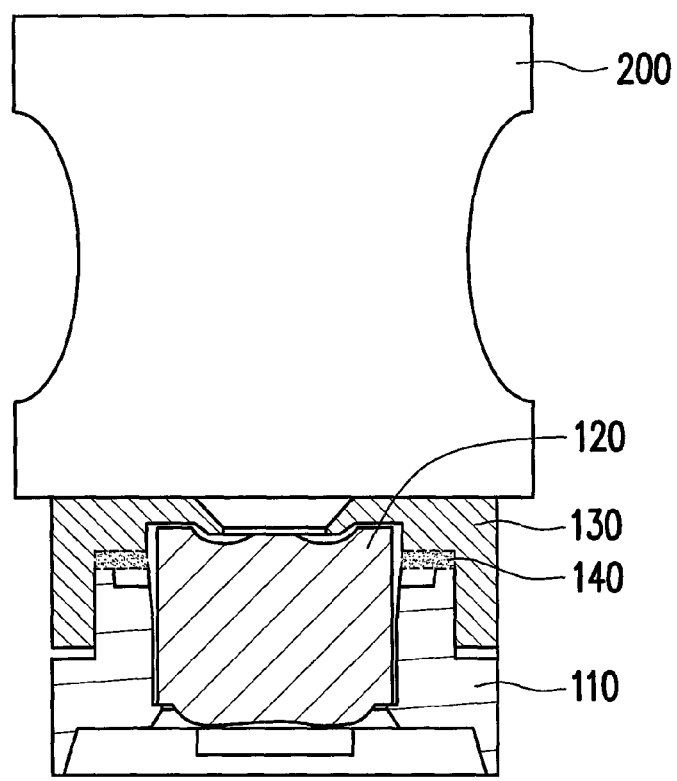
Figure 5:
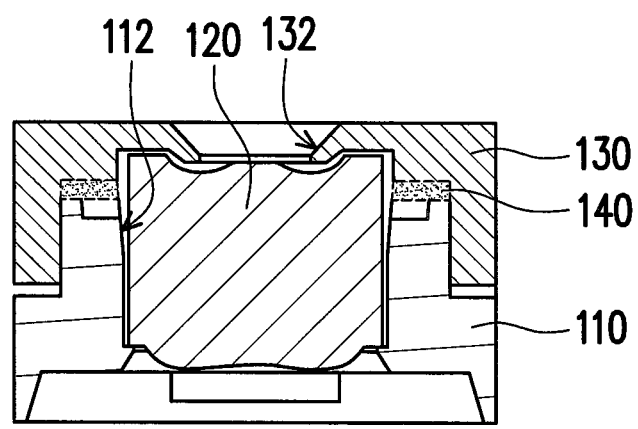
FIG. 5 is a cross-sectional view of an image capturing device according to an embodiment of the invention.

Finally, referring to FIG. 4, an Ultrasonic Welding is applied on the lens holder 110 and the casing 130 by an HORN 200 for forming a melting interface 140 between the lens holder 110 and the casing 130 so as to fix the casing 130 to the lens holder 110. In the present embodiment, the melting interface 140 is formed by melting part of the lens holder 110 and/or the casing 130, and the ultrasonic frequency of the Ultrasonic Welding is around, for example, 15,000 Hz or the above, but the present invention is not limited thereto. As long as the ultrasonic frequency is high enough to perform the ultrasonic welding to melt the interface of the lens holder 110 and the casing 130 for fixing the lens holder 110 and the casing 130 together, it falls within the scope of the disclosure and their equivalents. After the Ultrasonic Welding is applied on the lens holder 110 and the casing 130, a cooling treatment may be applied to solidify the melting interface 140. The present invention does not limit the methods of the cooling treatment herein.

By applying the Ultrasonic Welding to form the melting interface 140 between the lens holder 110 and the casing 130, the casing 130 is then fixed to the lens holder 110. Compared with the conventional assembling method, the present embodiment simplifies the assembling process and shorten the assembling time. Also, the Ultrasonic Welding can be applied by an HORN, the labor cost is thus reduced and the assembling method of the present embodiment is suitable and faster for mass production.

In addition, for the common difference in manufacturing, the heights of the lens modules 120 may be vary. Therefore, the height of the lens holder 110 is designed to be slightly greater than the desired height to accommodate the common differences between the lens modules 120. By applying the Ultrasonic Welding, the lens holder 110 can be adjusted to the desired height by controlling the melting amount of the lens holder 110. Therefore, the present embodiment not only can simplify the assembling process, reduce the production cost, but also can improve the production quality of the image capturing device.

As following the steps of the assembling method described above, an image capturing device 100 is assembled. The image capturing device 100 including a lens holder 110, a lens module 120 and a casing 130. The lens holder 110 includes a containing cavity 112. The lens module 120 is disposed in the containing cavity 112 of the lens holder 110. The casing 130 is disposed on the lens holder 110 and the lens module 120. The casing 130 includes a light entering opening 132 exposing the part of the lens module 120. A melting interface 140 is located between the lens holder 110 and the casing 130 to fix the lens holder 110 and the casing 130 together. The melting interface 140 is formed by applying the Ultrasonic Welding to melt part of the lens holder 110 and/or the casing 130, therefore, the melting interface 140 is integrally formed with either the lens module 120 or the casing 130 or part of the both.

In sum, the present invention applies the Ultrasonic Welding to form an melting interface between the lens holder and the casing, so as to fix the casing to the lens holder. Compared with the conventional assembling method, the present invention saves the complicated processes of two times of gel dispensing and baking, thereby simplifies the assembling process and shorten the assembling time of the image capturing device. Moreover, the Ultrasonic Welding is applied by an HORN, the labor cost is thus reduced and the image capturing device of the present invention is suitable for faster mass production.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An assembling method of an image capturing device, comprising:
   providing a lens holder, a lens module and a casing, wherein the lens holder comprises a containing cavity;
   disposing the lens module in the containing cavity of the lens holder;
   disposing the casing on the lens holder and the lens module, wherein the casing covers a part of the lens module; and
   applying an Ultrasonic Welding on the lens holder and the casing for forming a melting interface between the lens holder and the casing so as to fix the casing to the lens holder.

2. The assembling method of an image capturing device as claimed in claim 1, further comprising:
   after applying the Ultrasonic Welding on the lens holder and the casing, applying a cooling treatment to solidify the melting interface.

3. The assembling method of an image capturing device as claimed in claim 1, wherein the melting interface is formed by melting part of the lens holder or the casing.

4. The assembling method of an image capturing device as claimed in claim 1, wherein the casing further comprises a light entering opening exposing the part of the lens module.

5. The assembling method of an image capturing device as claimed in claim 1, wherein the lens module includes wafer-level module (WLM).

6. An image capturing device, comprising:
   a lens holder, comprising a containing cavity;
   a lens module, disposed in the containing cavity of the lens holder; and
   a casing, disposed on the lens holder and the lens module, the casing covering a part of the lens module, wherein a melting interface is located between the lens holder and the casing to fix the lens holder and the casing together.

7. The image capturing device as claimed in claim 6, wherein the melting interface is integrally formed with the lens holder.

8. The image capturing device as claimed in claim 6, wherein the melting interface is integrally formed with the casing.

9. The image capturing device as claimed in claim 6, wherein the casing further comprises a light entering opening exposing the part of the lens module.

10. The image capturing device as claimed in claim 6, wherein the lens module includes wafer-level module (WLM).

* * * * *